United States Patent
Mandt et al.

(10) Patent No.: US 11,544,606 B2
(45) Date of Patent: Jan. 3, 2023

(54) MACHINE LEARNING BASED VIDEO COMPRESSION

(71) Applicant: Disney Enterprises, Inc., Burbank, CA (US)

(72) Inventors: Stephan Marcel Mandt, Santa Monica, CA (US); Christopher Schoers, Zurich (CH); Jun Han, Hanover, NH (US); Salvator D. Lombardo, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 581 days.

(21) Appl. No.: 16/254,475

(22) Filed: Jan. 22, 2019

(65) Prior Publication Data

US 2020/0090069 A1     Mar. 19, 2020

Related U.S. Application Data

(60) Provisional application No. 62/731,672, filed on Sep. 14, 2018.

(51) Int. Cl.
*G06N 7/00* (2006.01)
*H04N 19/42* (2014.01)
(Continued)

(52) U.S. Cl.
CPC ............ *G06N 7/005* (2013.01); *G06N 3/04* (2013.01); *G06N 3/08* (2013.01); *G06N 20/00* (2019.01); *H04N 19/42* (2014.11)

(58) Field of Classification Search
CPC .......... G06N 3/04; G06N 3/08; G06N 7/005; G06N 20/00
See application file for complete search history.

(56) References Cited

U.S. PATENT DOCUMENTS

| 10,623,775 B1 * | 4/2020 | Theis ............... H04N 19/124 |
| 2017/0230675 A1 * | 8/2017 | Wierstra ............... G06N 3/08 |

FOREIGN PATENT DOCUMENTS

| CN | 102714729 A | 10/2012 |
| CN | 104602007 A | 5/2015 |

(Continued)

OTHER PUBLICATIONS

Probabilistic Video Generation using Holistic Attribute Control (Jiawei He, Andreas Lehrmann, Joseph Marino, Greg Mori, Leonid Sigal) taken from https://arxiv.org/abs/1803.08085 (Year: 2018).*

(Continued)

*Primary Examiner* — Benjamin P Geib

(74) *Attorney, Agent, or Firm* — Artegis Law Group, LLP

(57) ABSTRACT

Systems and methods for compressing target content are disclosed. In one embodiment, a system may include non-transient electronic storage and one or more physical computer processors. The one or more physical computer processors may be configured by machine-readable instructions to obtain the target content comprising one or more frames, wherein a given frame comprises one or more features. The one or more physical computer processors may be configured by machine-readable instructions to obtain a conditioned network. The one or more physical computer processors may be configured by machine-readable instructions to generate decoded target content by applying the conditioned network to the target content.

20 Claims, 12 Drawing Sheets

(51) Int. Cl.
  *G06N 20/00*  (2019.01)
  *G06N 3/04*  (2006.01)
  *G06N 3/08*  (2006.01)

(56) References Cited

FOREIGN PATENT DOCUMENTS

| CN | 106604036 A | 4/2017 |
| CN | 107113432 A | 8/2017 |
| CN | 107577943 A | 1/2018 |

OTHER PUBLICATIONS

Lossy Image Compression With Compressive Autoencoders (Lucas Theis, Wenzhe Shi, Andrew Cunningham, Ferenc Huszár) taken from https://arxiv.org/abs/1703.00395 (Year: 2017).*

Variational image compression with a scale hyperprior (Johannes Ballé, David Minnen, Saurabh Singh, Sung Jin Hwang, Nick Johnston) taken from https://arxiv.org/abs/1802.01436 (Year: 2018).*

An Experience in Image Compresslon using Neural Networks (Ivan vilovic) taKen from https://ieeexplore.ieee.org/abstract/document/4127496 (Year: 2006).*

Motion Estimation for Video Compression Using Kalman Filtering (Chung-Ming Kuo*'. Chaur-Heh Hsieh*, Yue-Dar Jou*, Hsieh-Cheng Lino, Po-Chiang Lu') taken from https://ieeexplore.ieee.org/abstract/document/506827 (Year: 1996).*

Anonymous, "Deep Probabilistic Video Compression," ICLR 2019, pp. 1-11.

Li et al., "Disentangled Sequential Autoencoder", Proceedings of the 35th International Conference on Machine Learning, arXiv:1803.02991, Mar. 8, 2018, 12 pages.

* cited by examiner

MACHINE LEARNING BASED VIDEO COMPRESSION

CROSS-REFERENCE TO RELATED APPLICATIONS

The present application claims priority to U.S. Provisional Patent Application No. 62/731,672, filed Sep. 14, 2018, which is incorporated herein by reference.

TECHNICAL FIELD

The present disclosure relates generally to video compression.

BRIEF SUMMARY

Embodiment of the disclosure are directed to systems and methods for compressing video.

In one embodiment, a system may be configured for compressing content. The system may include non-transient electronic storage and one or more physical computer processors configured by machine-readable instructions to perform a number of operations. One operation may be to obtain, from the non-transient electronic storage, the target content comprising one or more frames. A given frame may include one or more features. Another operation may be to obtain, from the non-transient electronic storage, a conditioned network. The conditioned network may have been trained by training an initial network using training content. The conditioned network may include one or more encoders, one or more quantizers, and one or more decoders. The training content may include one or more training frames. A given training frame may include one or more training features. Another such operation may be to generate, with the one or more physical computer processors, decoded target content by applying the conditioned network to the target content. The conditioned network may generate a latent space of the target content. The target content may include one or more local variables and one or more global variables.

In embodiments, applying the conditioned network may include encoding, with the one or more physical computer processors, the target content using the conditioned network to generate one or more local variables and one or more global variables. Applying the conditioned network may include generating, with the one or more physical computer processors, the latent space using the conditioned network. The latent space may include the one or more local variables and the one or more global variables. The one or more local variables may be based on the one or more features in the given frame. The one or more global variables may be based on one or more features common to multiple frames of the target content. Applying the conditioned network may include generating, with the one or more physical computer processors, multiple distributions corresponding to the latent space using the conditioned network. The multiple distributions indicate a likelihood of values for the one or more local variables and the one or more global variables. Applying the conditioned network may include quantizing, with the one or more physical computer processors, the latent space.

In embodiments, encoding the target content may include applying, with the one or more physical computer processors, multiple convolutional layers to the target content. Encoding the target content may include applying, with the one or more physical computer processors, a global model to convolved target content to generate the one or more global variables. Encoding the target content may include applying, with the one or more physical computer processors, a multilayer perceptron model to the convolved target content to generate the one or more local variables.

In embodiments, the global model comprises one or more of a long short-term memory model and a Kalman filter.

In embodiments, applying the conditioned network may further include encoding, with the one or more physical computer processors, quantized latent space using the multiple distributions. Applying the conditioned network may further include decoding, with the one or more physical computer processors, encoded latent space.

In embodiments, decoding the quantized latent space may include entropy decoding, with the one or more physical computer processors, the encoded latent space. Decoding the quantized latent space may include combining, with the one or more physical computer processors, entropy decoded latent space with a multilayer perceptron model. Decoding the quantized latent space may include applying, with the one or more physical computer processors, multiple deconvolutions to a combination of the entropy decoded latent space with the multilayer perceptron model.

In embodiments, the multiple distributions corresponding to the latent space are centered around the means of the one or more global variables and the one or more local variables and comprise noise.

In another embodiment, a computer-implemented method for training an initial network to simultaneously learn how to refine a latent space using training content and how to refine multiple distributions of the latent space using the training content may be implemented in a computer system. The computer system may include non-transient electronic storage and one or more physical computer processors. The computer-implemented method may include obtaining, from the non-transient electronic storage, training content comprising one or more frames. The computer-implemented method may also include obtaining, from the non-transient electronic storage, the initial network. The initial network may include one or more encoders, one or more quantizers, and one or more decoders. The computer-implemented method may include generating, with the one or more physical computer processors, a conditioned network by training the initial network using the training content. The conditioned network may include the one or more encoders, the one or more quantizers, and the one or more decoders. The computer-implemented method may include storing, in the non-transient electronic storage, the conditioned network.

In embodiments, the computer-implemented method may further include obtaining, from the non-transient electronic storage, the target content including one or more frames. A given frame may include one or more features. The computer-implemented method may include encoding, with the one or more physical computer processors, the target content to generate one or more local variables and one or more global variables using the conditioned network. The computer-implemented method may include generating, with the one or more physical computer processors, the latent space using the conditioned network. The latent space may include the one or more local variables and the one or more global variables. The one or more local variables are based on the one or more features in the given frame. The one or more global variables are based on one or more features common to multiple frames of the target content. The computer-implemented method may include generating, with the one or more physical computer processors, the multiple distributions corresponding to the latent space using the conditioned network. The multiple distributions may indicate multiple likelihoods of values for the one or more local variables and the one or more global variables. The computer-implemented method may include quantizing, with the one or more physical computer processors, the latent space based on the multiple distributions using the conditioned network.

In embodiments, encoding the target content may include applying, with the one or more physical computer processors, multiple convolutional layers to the target content. Encoding the target content may include applying, with the one or more physical computer processors, a long short-term memory model to convolved target content to generate the one or more global variables. Encoding the target content may include applying, with the one or more physical computer processors, a multilayer perceptron model to the convolved target content to generate the one or more local variables.

In embodiments, the computer-implemented method may further include encoding, with the one or more physical computer processors, quantized latent space. The computer-implemented method may include decoding, with the one or more physical computer processors, encoded latent space.

In embodiments, decoding the quantized latent space may include entropy decoding, with the one or more physical computer processors, the encoded latent space. Decoding the quantized latent space may include combining, with the one or more physical computer processors, entropy decoded latent space with a multilayer perceptron model. Decoding the quantized latent space may include applying, with the one or more physical computer processors, multiple deconvolutions to a combination of the entropy decoded latent space with the multilayer perceptron model.

In embodiments, the multiple distributions corresponding to the latent space are centered around the means of the one or more global variables and the one or more local variables and comprise noise.

In one embodiment, a computer-implemented method for compressing target content may be implemented in a computer system that includes non-transient electronic storage and one or more physical computer processors. The computer-implemented method may include obtaining, from the non-transient electronic storage, the target content including one or more frames. A given frame includes one or more features. The computer-implemented method may include encoding, with the one or more physical computer processors, the target content to generate one or more local variables and one or more global variables. The computer-implemented method may include generating, with the one or more physical computer processors, a latent space, the latent space including the one or more local variables and the one or more global variables. The one or more local variables are based on the one or more features in the given frame. The one or more global variables are based on one or more features common to multiple frames of the target content.

In embodiments, the computer-implemented method may further include generating, with the one or more physical computer processors, multiple distributions corresponding to the latent space. The multiple distributions may indicate a likelihood of values for the one or more local variables and the one or more global variables. The computer-implemented method may include quantizing, with the one or more physical computer processors, the latent space based on the multiple distributions.

In embodiments, encoding the target content may include applying, with the one or more physical computer processors, multiple convolutional layers to the target content. Encoding the target content may include applying, with the one or more physical computer processors, a long short-term memory model to convolved target content to generate the one or more global variables. Encoding the target content may include applying, with the one or more physical computer processors, a multilayer perceptron model to the convolved target content to generate the one or more local variables.

In embodiments, the computer-implemented method may further include encoding, with the one or more physical computer processors, quantized latent space. the computer-implemented method may include decoding, with the one or more physical computer processors, encoded latent space.

In embodiments, decoding the quantized latent space may include entropy decoding, with the one or more physical computer processors, the encoded latent space. Decoding the quantized latent space may include combining, with the one or more physical computer processors, entropy decoded latent space with a multilayer perceptron model. Decoding the quantized latent space may include applying, with the one or more physical computer processors, multiple deconvolutions to a combination of the entropy decoded latent space with the multilayer perceptron model.

In embodiments, the multiple distributions corresponding to the latent space are centered around the means of the one or more global variables and the one or more local variables and random noise is added to the multiple distributions.

In embodiments, the latent space comprises a global density model corresponding to the one or more global variables and a local density model corresponding to the one or more local variables.

In embodiments, the global density model is defined by $$p_\theta(f) = \prod_i^{dim(f)} p_\theta(f^i) * \mathcal{U}\left(-\frac{1}{2}, \frac{1}{2}\right)$$

where $p_\theta$ represents a density model, f represents the one or more global variables, i represents a dimensional index corresponding to a dimension of the one or more global variables, and $\mathcal{U}(-\frac{1}{2},\frac{1}{2})$ represents random noise, and wherein the local density model is defined by $$p_\theta(z_{1:T}) = \prod_i^T \prod_i^{dim(z)} p_\theta(z_t^i \mid c_t) * \mathcal{U}\left(-\frac{1}{2}, \frac{1}{2}\right)$$

where $p_\theta$ represents a density model, z represents the one or more local variables, T represents a time corresponding to the given frame, i represents a dimensional index corresponding to a dimension of the one or more global variables, $c_t$ represents a context parameter corresponding to T, and $\mathcal{U}(-\frac{1}{2},\frac{1}{2})$ represents random noise.

BRIEF DESCRIPTION OF THE DRAWINGS

Aspects of the present disclosure will be appreciated upon review of the detailed description of the various disclosed embodiments, described below, when taken in conjunction with the accompanying figures.

Figure 1A:
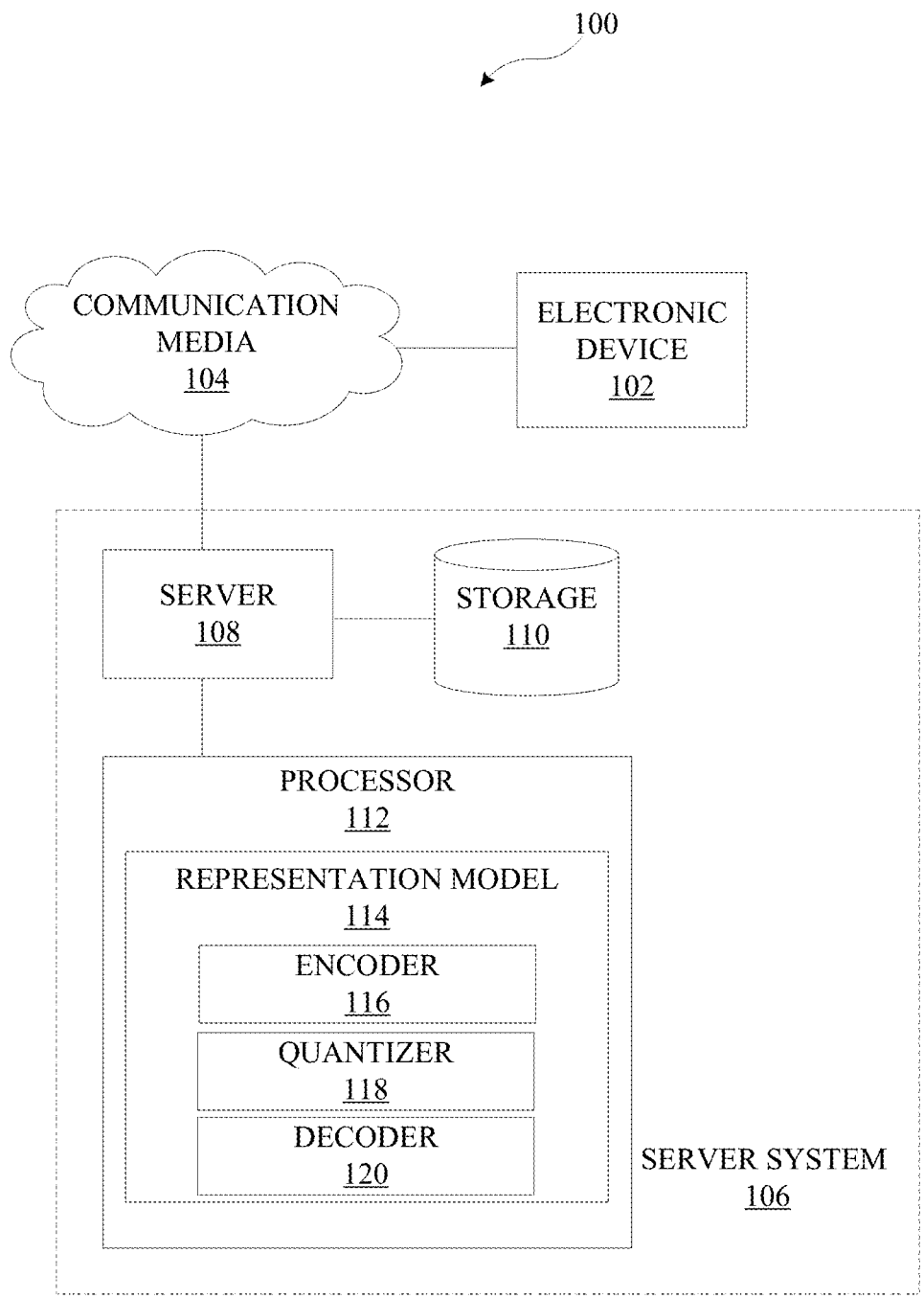
FIG. 1A illustrates an example system for compressing content, in accordance with various embodiments.

The figures are described in greater detail in the description and examples below, are provided for purposes of illustration only, and merely depict example embodiments of the disclosure. The figures are not intended to be exhaustive or to limit the disclosure to the precise form disclosed. It should also be understood that the disclosure may be practiced with modification or alteration, and that the disclosure may be limited only by the claims and the equivalents thereof.

DETAILED DESCRIPTION

The present disclosure relates to systems and methods for machine learning based video compression. Video compression may include lossless compression and lossy compression. For example, lossless video compression may be associated with probabilistic modeling. Accurate probabilistic knowledge of a subsequent video frame in a sequence may maximally compress the information content in the original video. Lossy compression may include discarding irrelevant image information to reduce a file size while a perceived image quality remains acceptable. The procedure for throwing away information may filter information that is not relevant for the perceived video quality. Existing uses of variational autoencoder (VAE) frameworks have been applied to single image compression applications, and existing video compression frameworks using machine learning (i.e., deep learning) have only focused on frame interpolation. The presently disclosed technology uses a time-varying probability distribution of the media frames to achieve a higher compression ratio.

Existing codecs may use key frames which are stored with image compression and used to interpolate to in-between frames. Instead of singling out certain frames as key frames, the presently disclosed technology may use all frames more coherently and decide which information from the entire sequence should be stored. Video codecs used for video compression generally decompose video into a set of key frames encoded as single images, and a set of frames for which interpolation is used. In contrast, the present disclosure applies deep learning (e.g., neural networks) to encode, compress, and decode video.

In embodiments, a compression codec may include an encoder and a decoder. The encoder may convert media content into a string of bits, and the decoder may recover the original media content from the bits. The codec may be configured to convert the media into the smallest number of bits possible, based on an image quality selected by a user. In order to maximally compress the source, a predictive model may be used by both the encoder and decoder when writing to/from and reading to/from a compressed format. The presently disclosed technology may use a deep generative model which is capable of learning the sequential probability distribution of images from a media source and may serve as a predictive model for the next video frame at any given time. Image codecs, such as, for example, JPEG or GIF, may encode each image independently, while video codecs, such as, for example, MPEG-4 part 2, H.264, or H.265, may encode the entire sequence of video frames.

In embodiments, a predictive model may include a VAE framework to perform video compression. An encoder part of the VAE framework may be used to encode a sequence of media frames into a latent representation (e.g., the compressed data that may be used to decode the media content). The latent space may be discretized at compression time so that the latent variables may be converted into a compressed format, such as, for example binary. The original media sequence can be recovered from the compressed format by the use of the decoder part of the VAE, which decodes the latent variables from the compressed format and produces an approximation to the original video frame from the latent variables.

Further embodiments disclosed herein are directed towards media compression using machine learning to reduce a media file size. For example, individual video frames may be transformed into a representation which may filter out irrelevant information, and the temporal aspects of the video may be probabilistically modeled to reduce the compressed file length. The optimal image representation and time-dependent probability distributions may be generated by training a model on large video datasets with a sequential variational autoencoder. A VAE may use a form of unsupervised learning for complex probability distributions, as will be described herein.

Before describing the technology in detail, it may be useful to describe an example environment in which the presently disclosed technology can be implemented. FIG. 1A illustrates one such example environment 100.

Environment 100 may be used in connection with implementing embodiments of the disclosed systems, methods, and devices. By way of example, the various below-described components of FIG. 1A may be used to compress target content by encoding the target content, generating a latent space, generating one or more probability distributions, quantizing the latent space, encoding the quantized latent space, and/or decoding the latent space. Target content may include images, video, data, and/or other content. Target content may include one or more features and/or other information. The latent space may include one or more local variables and one or more global variables. The one or more local variables may be based on individual frames of the target content and/or based on intraframe spatial correlations. The one or more global variables may be based on multiple frames of the target content, the entire target content, and/or based on temporal correlations between the multiple frames of the target content. Server system 106 may include representation model 114, encoder 116, quantizer 118, and decoder 120, as will be described herein. Representation model 114 may learn how to refine a latent space using training content and how to refine multiple distributions of the latent space using the training content. Encoder 116 may transform the target content to generate a latent space and may encode one or more probability distributions corresponding to the latent space. Quantizer 116 may quantize and/or round the one or more latent space values based on the one or more probability distributions. Decoder 120 may decode the latent space and may transform the latent space back into the format of the target content.

Representation model 114 may be trained and/or conditioned to compress target content. Representation model 114 may include one or more of a neural network, a deep generative model, a long short-term memory (LSTM) model, a multilayer perceptron (MLP) model, a Kalman filter model, a quantizer, a VAE and corresponding decoder, an entropy encoder and corresponding decoder, an arithmetic encoder and a corresponding decoder, machine learning models, etc. An initial representation model may use unsupervised training on training content to refine a method of transforming the training content into a latent space that includes one or more local variables and/or one or more global variables, generating one or more probability distributions corresponding to one or more frames of the target content, and/or using the one or more latent variables and/or the one or more probability distributions for one or more previous frames in predicting and/or generating the one or more latent variables and/or the one or more probability distributions for one or more subsequent frames. The initial representation model may train by comparing one or more parameters of decoded training content to one or more parameters of the original training content and using the comparison as feedback to condition and/or train the initial representation model. The initial model may be trained in server system 106 using training data obtained from storage 110. The initial model may use machine learning (e.g., a neural network and/or other machine learning algorithms) to train model 114 and improve the output of model 114. The resulting conditioned model may be stored in storage 110.

The conditioned model may be able to transform target content into one or more local variables and one or more global variables and generate one or more probability distributions to encode. After encoding, the conditioned model may transform and decode the encoded target content. It should be appreciated that other training may be used to train representation model 114.

Figure 1B:
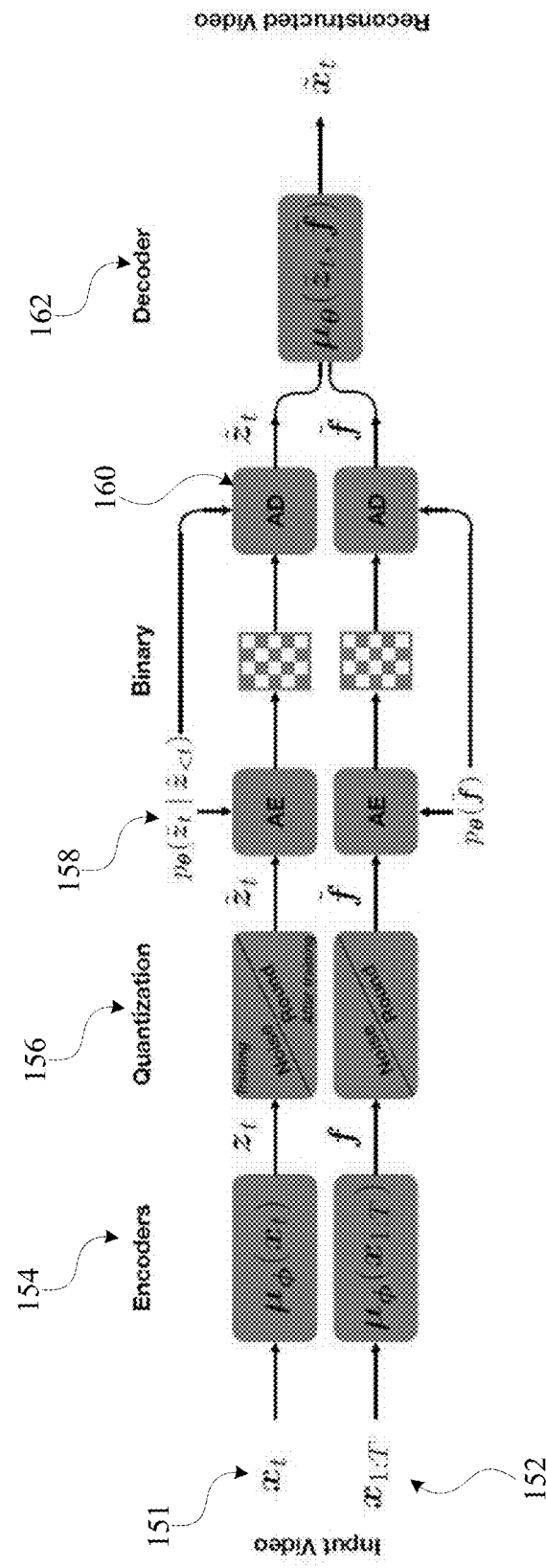
FIG. 1B illustrates an example architecture for a model to compress content, in accordance with various embodiments of the present disclosure.

FIG. 1B is an example conditioned representation model, in accordance with various embodiments of the present disclosure. Example representation model may include one or more encoders 154 and 158, quantizers 156, and decoders 160 and 162. Inputs 151 and 152 may include target content separated into individual frames and segments including multiple frames, respectively. Encoder 154 may extract/generate one or more local variables, $z_t$, from input 151 and one or more global variables, f, from input 152 based on the training content. Training, as described herein, may improve generation of the one or more latent variables from the target content. Encoder 154 may generate one or more probability distributions, $p_\theta$, corresponding to the one or more local variables and the one or more global variables. The one or more probability distributions may be generated based on a uniform distribution. It should be appreciated that other distributions may be used to generate the one or more probability distributions (e.g., Gaussian). In some embodiments, the one or more probability distributions may be centered at the means of the one or more latent variables. The means of the one or more variables may be generated and/or predicted based on encoder 154. It should be appreciated that other statistical values may be selected to be predicted and/or other values may be predicted based on machine learning. Training, as described herein, may improve generation of the one or more probability distributions.

Quantizer 156 may add, or inject, noise into the one or more latent variables and/or the one or more probability distributions and/or quantize the probability distributions, the one or more local variables, and/or the one or more global variables. Encoder 158 may entropy encode, arithmetically encode, and/or otherwise losslessly encode, the one or more probability distributions and/or the one or more variables into binary. This process may reduce one or more redundant latent variables. Decoder 160 may entropy decode one or more encoded probability distribution and/or one or more encoded variables from binary. Decoder 162 may decode and/or transform one or more entropy decoded probability distributions and/or one or more entropy decoded latent variables to generate decoded target content.

Encoders 154 and 158 and decoders 160 and 162 may use a probabilistic model which is learned, jointly with the encoder and decoder, during training on large video datasets, as described herein. The probabilistic model may be referred to as a prior or frame distribution. The prior may be a probability distribution for the next video frame given the previous video frames. The probability distribution may predict a distribution of plausible future video frames. In embodiments, model 114 may use info learned from a first frame to predict, or generate, one or more latent variables and one or more probability distributions for one or more subsequent frames.

In some embodiments, the prior model may depend on one or more previous frames (e.g., a deep Kalman filter). The prior model may factorize variables into global and local variables, as described herein. Information common to several frames may be stored as a global variable, and information that is new to each frame may be stored in the local variables. A fully-connected neural network may be used to determine whether information content should be stored in local or global variables to predict one or more subsequent frames based on one or more latent variables of one or more previous frames.

In some embodiments, the prior model may include a long short-term memory (LSTM) model to account for multiple previous frames instead of a single previous video frame. This model may have a longer memory than the Kalman filter model and consider a longer sequence of video frames to predict the next frame. In some embodiments, the LSTM model may be bi-directional, which accounts for a sequence of video frames before and after a given frame in order to predict the probability distributions for a given frame. A model with the bi-directional LSTM model may have the maximal amount of information (e.g., past and future frames) for prediction. In some embodiments, the bi-directional LSTM model may require additional side information to be stored to the compressed format. The additional side information may be used by the decoder to sequentially decode frames based on the probability distribution (which depends on the future frames it has not yet decoded). The hidden state of the bi-directional LSTM may include such information about the future frames. In this variation, the hidden state of the LSTM may be discretized and stored in the compressed video file.

In embodiments, the hidden state of the LSTM model may be used to predict the latent variables of the next frame. The hidden state of the LSTM may be used to predict the latent variables of the next frame. In some embodiments, the hidden state may encode the latent variables of the next frame. In another example, the hidden state of the LSTM may be combined with the latent variables of the previous frame to generate the next video frame. The hidden state of the LSTM may be used to transform, or generate, the latent variables of the previous frame into the latent variables of the next frame.

In some embodiments, the prior model may include motion representation models that use motion information to predict macroscopic movement and/or other movement. In embodiments, motion information may be nonlinearly encoded in the structure of the latent representation of the video to improve compression. The prior model may be scaled for different resolution media based on a size of a neural network.

Referring back to FIG. 1A, encoder 116 may transform content, encode content, and/or generate multiple distributions, as described above. Quantizer 118 may inject noise and/or quantize target content, as described above. Decoder 120 may decode and transform the latent space to a format of the target content, as described above.

Electronic device 102 may include a variety of electronic computing devices, such as, for example, a smartphone, tablet, laptop, computer, wearable device, television, virtual reality device, augmented reality device, displays, connected home device, Internet of Things (IOT) device, smart speaker, and/or other devices. Electronic device 102 may present content to a user and/or receive requests to send content to another user. In some embodiments, electronic device 102 may apply representation model 114, encoder 116, quantizer 118, and/or decoder 120 to target content. In embodiments, electronic device 102 may store representation model 114, encoder 116, quantizer 118, and decoder 120.

As shown in FIG. 1A, environment 100 may include one or more of electronic device 102 and server system 106. Electronic device 102 can be coupled to server system 106 via communication media 104. As will be described in detail herein, electronic device 102 and/or server system 106 may exchange communications signals, including content, one or more features, one or more latent spaces, one or more local variables, one or more global variables, one or more models, metadata, user input, side information, and/or other information via communication media 104.

In various embodiments, communication media 104 may be based on one or more wireless communication protocols such as Wi-Fi, Bluetooth®, ZigBee, 802.11 protocols, Infrared (IR), Radio Frequency (RF), 2G, 3G, 4G, 5G, etc., and/or wired protocols and media. Communication media 104 may be implemented as a single medium in some cases.

As mentioned above, communication media 104 may be used to connect or communicatively couple electronic device 102 and/or server system 106 to one another or to a network, and communication media 104 may be implemented in a variety of forms. For example, communication media 104 may include an Internet connection, such as a local area network (LAN), a wide area network (WAN), a fiber optic network, internet over power lines, a hard-wired connection (e.g., a bus), and the like, or any other kind of network connection. Communication media 104 may be implemented using any combination of routers, cables, modems, switches, fiber optics, wires, radio (e.g., microwave/RF links), and the like. Upon reading the present disclosure, it should be appreciated that other ways may be used to implement communication media 104 for communications purposes.

Likewise, it will be appreciated that a similar communication medium may be used to connect or communicatively couple server 108, storage 110, processor 112, representation model 114, encoder 116, quantizer 118, and/or decoder 120 to one another in addition to other elements of environment 100. In example embodiments, communication media 104 may be or include a wired or wireless wide area network (e.g., cellular, fiber, and/or circuit-switched connection, etc.) for electronic device 102 and/or server system 106, which may be relatively geographically disparate; and in some cases, aspects of communication media 104 may involve a wired or wireless local area network (e.g., Wi-Fi, Bluetooth, unlicensed wireless connection, USB, HDMI, standard AV, etc.), which may be used to communicatively couple aspects of environment 100 that may be relatively close geographically.

Server system 106 may provide, receive, collect, or monitor information to/from electronic device 102, such as, for example, content, one or more features, one or more latent spaces, one or more local variables, one or more global variables, one or more models, metadata, user input, security and encryption information, side information, and the like. Server system 106 may be configured to receive or send such information via communication media 104. This information may be stored in storage 110 and may be processed using processor 112. For example, processor 112 may include an analytics engine capable of performing analytics on information that server system 106 has collected, received, etc. from electronic device 102. Processor 112 may include representation model 114, encoder 116, quantizer 118, and decoder 120 capable of receiving content, encoding content, quantizing content, decoding content, analyzing content, and otherwise processing content that server system 106 has collected, received, etc. based on requests from, or coming from, electronic device 102. In embodiments, server 108, storage 110, and processor 112 may be implemented as a distributed computing network, a relational database, or the like.

Server 108 may include, for example, an Internet server, a router, a desktop or laptop computer, a smartphone, a tablet, a processor, a component, or the like, and may be implemented in various forms, including, for example, in an integrated circuit or collection thereof, in a printed circuit board or collection thereof, or in a discrete housing/package/rack or multiple of the same. Server 108 may update information stored on electronic device 102. Server 108 may send/receive information to/from electronic device 102 in real-time or sporadically. Further, server 108 may implement cloud computing capabilities for electronic device 102. Upon studying the present disclosure, one of skill in the art will appreciate that environment 100 may include multiple electronic devices 102, communication media 104, server systems 106, servers 108, storage 110, processors 112, representation model 114, encoder 116, quantizer 118, and/or decoder components 120.

Figure 2:
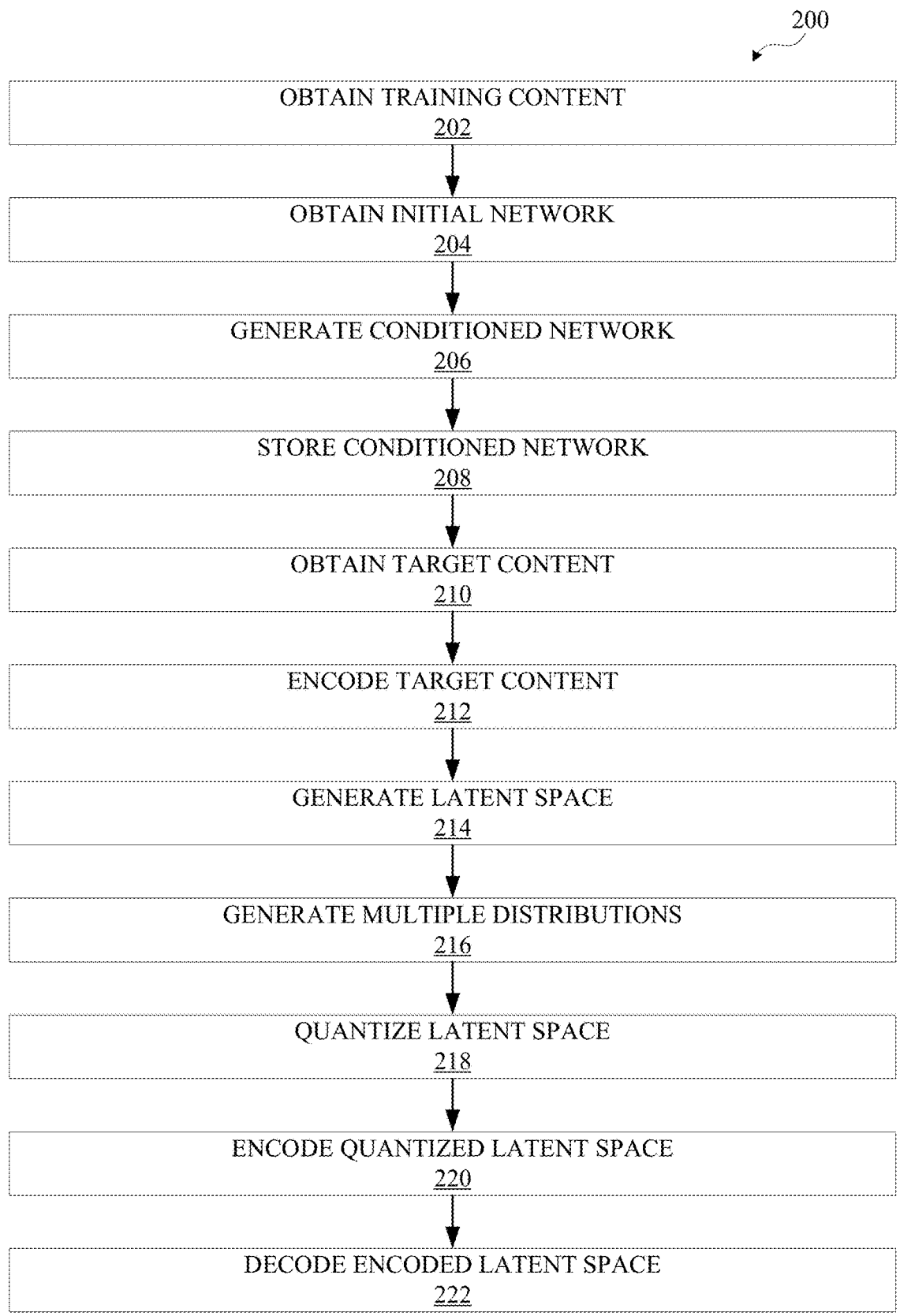
FIG. 2 is an operational flow diagram illustrating an example process for compressing content, in accordance with one embodiment.

FIG. 2 is an operational flow diagram illustrating an example process for compressing target content, in accordance with one embodiment. The operations of the various methods described herein are not necessarily limited to the order described or shown in the figures, and it should be appreciated, upon studying the present disclosure, that variations of the order of the operations described herein are within the spirit and scope of the disclosure.

The operations and sub-operations of the flow diagram may be carried out, in some cases, by one or more of the components, elements, devices, components, and circuitry of system 100. This may include one or more of: server system 106; server 108; processor 112; storage 110; and/or computing component 1100, described herein and referenced with respect to at least FIGS. 1A, 1B and 11, as well as subcomponents, elements, devices, components, and circuitry depicted therein and/or described with respect thereto. In such instances, the description of the flow diagram may refer to a corresponding component, element, etc., but regardless of whether an explicit reference is made, it will be appreciated, upon studying the present disclosure, when the corresponding component, element, etc. may be used. Further, it will be appreciated that such references do not necessarily limit the described methods to the particular component, element, etc. referred to. Thus, it will be appreciated that aspects and features described above in connection with (sub-) components, elements, devices, circuitry, etc., including variations thereof, may be applied to the various operations described in connection with the flow diagram without departing from the scope of the present disclosure.

At operation 202, training content may be obtained. The training content may include an image, a video, and/or other media content. The training content may include one or more features. The one or more features may be used to generate a latent space including one or more local variables and/or one or more global variables.

At operation 204, an initial network may be obtained. The initial network may include one or more encoders, quantizers, and/or decoders, as described above.

At operation 206, a conditioned network may be generated by training the initial network using the training content. The conditioned network may be trained to refine the encoding process used to generate the one or more local variables and/or the one or more global variables, as described above. The conditioned network may be trained to refine the encoding process used to generate the multiple distributions, as described above. In embodiments, the conditional network may predict subsequent frames using the one or more latent variables and/or one or more probability distributions from one or more previous frames.

In one example, an encoder and decoder may be simultaneously trained by minimizing an evidence lower bound. The optimization can be modified by rescaling individual terms in a lower bound to achieve different probabilistic behavior of the latent representations. The modification may be used to adjust the tradeoff between video quality and compressed video file length. For example, β-encoder loss may be defined by $$-\mathbb{E}_{\tilde{f},\tilde{z}_{1:T}\sim q}\left[\log p_\theta(x_{1:T}\mid \tilde{f}, \tilde{z}_{1:T})\right] - \beta \mathbb{E}_{\tilde{f},\tilde{z}_{1:T}\sim q}\left[\log p_\theta(\tilde{f}, \tilde{z}_{1:T})\right] =$$

$$\mathbb{E}_{\tilde{f},\tilde{z}_{1:T}\sim q}\sum_{t=1}^{T}\|\tilde{x}_t - x_t\|_1 + \beta H\left[q_\phi(\tilde{z}_{1:T}, f\mid x_{1:T}), p_\theta(\tilde{f}, \tilde{z}_{1:T})\right]$$

where the reconstructed frame $\tilde{x}_t = \mu_\theta(\mu_\phi(x_{1:T}))$, $\mathbb{E}$ may represent an expected value (e.g., a weighted average of expected values), and the remaining variables may represent the same functionality as described herein. In some embodiments, the second term with βH may correspond to the expected code length when using the prior distribution, p(f, $z_{1:T}$), to entropy code the latent space. The second term may be minimized when the empirical distribution of codes matches the prior model (e.g., $p(f,z_{1:T}) = q(f,z_{1:T}|x_{1:T})$. In embodiments, a cross entropy for the one or more global variables may be defined by $$H\left[q_\phi(f\mid x_{1:T}), p_\theta(f)\right] =$$

$$H\left[q_\phi(f\mid x_{1:T}), p_\theta(f^i)\right] = -\mathbb{E}_{f\sim q}\sum_{i=1}^{N}\log_2 p_\theta(f^i) + \beta H$$

where the variables may have the same representation as described above. A cross entropy for the one or more local variables may be defined by $$H\left[q_\phi(z_{1:T}\mid x_{1:T}), p_\theta(z_{1:T})\right] =$$

$$H\left[q_\phi(z_{1:T}\mid x_{1:T}), p_\theta(z_{1:T})\right] = -\mathbb{E}_{z_{1:T}\sim q}\sum_{t=1}^{T}\sum_{i=1}^{N}\log_2 p_\theta(z_t^i\mid c_t)$$

where the variables may have the same representation as described above and $c_t$ may represent a context variable.

At operation 208, the conditioned network may be stored, for example, in the non-transient electronic storage.

At operation 210, target content may be obtained. The target content may include an image, a video, and/or other media content. The target content may include one or more features. The one or more features may be used to generate a latent space including one or more local variables and/or one or more global variables.

At operation 212, the target content may be encoded. Encoding target content may generate one or more local variables and one or more global variables. In embodiments, encoding target content may include applying, with the one or more physical computer processors, multiple convolutional layers to the target content. Encoding target content may include applying, with the one or more physical computer processors, a long short-term memory model to convolved target content to generate the one or more global variables. Encoding target content may also include applying, with the one or more physical computer processors, a multilayer perceptron model to the convolved target content to generate the one or more local variables. In some embodiments, the probabilistic model that may be used to generate the one or more latent variables may be defined by $$p_\theta(x_{1:T}, z_{1:T}, f) = p_\theta(f) p_\theta(z_{1:T}) \prod_{t=1}^{T} p_\theta(x_t \mid z_t, f)$$

where $p_\theta$ may represent a probability with parameter $\theta$, $x_{1:T}$ may represent a given frame of target content at time T, $z_{1:T}$ may represent the one or more local variables at time T, and f may represent the one or more global variables. $\theta$ may be the shorthand notation for all the parameters of the generative model.

At operation 214, a latent space may be generated. The latent space may include the one or more local variables and/or the one or more global variables. The one or more local variables are based on the one or more features in the given frame. The one or more global variables are based on one or more features common to multiple frames of the target content. In embodiments, the latent space may include a global density model corresponding to the one or more global variables and a local density model corresponding to the one or more local variables. The global density may be defined by $$p_\theta(f) = \prod_{i}^{dim(f)} p_\theta(f^i) * \mathcal{U}\left(-\frac{1}{2}, \frac{1}{2}\right)$$

where $p_\theta$ may represent a density model, f may represent the one or more global variables, i may represent a dimensional index corresponding to a dimension of the one or more global variables, and $\mathcal{U}(*)$ may represent a uniform probability distribution. It should be appreciated that other values and/or models may be used to determine the global density. The stationary density $p_\theta(f)$ may be parameterized by a flexible non-parametric, fully factorized model. The cumulative probability density may be parameterized by a neural network, or a Gaussian probability distribution may be used. The stationary density may include one or more nonlinear probability densities.

The local density model may be defined by $$p_\theta(z_{1:T}) = \prod_{i}^{T} \prod_{i}^{dim(z)} p_\theta(z_t^i \mid c_t) * \mathcal{U}\left(-\frac{1}{2}, \frac{1}{2}\right)$$

where $p_\theta$ may represent a density model, z may represent the one or more local variables, T may represent a time corresponding to the given frame, i may represent a dimensional index corresponding to a dimension of the one or more global variables, $c_t$ may represent a context parameter corresponding to T, and $\mathcal{U}(*)$ may represent a uniform probability distribution. It should be appreciated that other values and/or models may be used to determine the global density. In some embodiments, $p_\theta(z_t^i \mid c_t) \equiv p_\theta(z_t^i \mid z_{<t})$. In embodiments, $p_\theta(z_t^i \mid c_t) \equiv p_\theta(z_t^i \mid z_{t-1})$.

At operation 216, multiple distributions may be generated. The multiple distributions may indicate a likelihood of values for the one or more local variables and/or the one or more global variables. The multiple distributions corresponding to the latent space may be centered around the means of the one or more global variables and the one or more local variables. In some embodiments, random noise may be added during training to approximate rounding errors that may occur during application (e.g., after training). For example, random noise may be $\in_i \sim \mathcal{U}(-\frac{1}{2}, \frac{1}{2})$. It should be appreciated that the amount of random noise may be based on how the distribution is generated. For example, the distribution may be defined by $$q_\phi(z_{1:T}, f \mid x_{1:T}) = q_\phi(f \mid x_{1:T}) \prod_{t=1}^{T} q_\phi(z_t \mid x_t)$$

where $q_\phi(z_{1:T}, f \mid x_{1:T})$ may represent an approximation to the true posterior, $\phi$ may represent one or more parameters, z may represent the one or more local variables, T may represent a time corresponding to the given frame, and f may represent the one or more local variables. It should be appreciated that different equations and variables may be used in different applications.

In one example, a uniform distribution for the one or more global variables may be defined by $$\tilde{f} \sim q_\phi(f \mid x_{1:T}) = \mathcal{U}(\hat{f} - \frac{1}{2}, \hat{f} + \frac{1}{2})$$

where $\tilde{f}$ may represent a latent variable with added noise, $q_\phi$ may represent an approximation for the global posterior, f may represent the one or more global variables, $x_{1:T}$ may represent a given frame of target content at time T, $\mathcal{U}$ may represent noise added, and $\hat{f}$ may represent a mean of the one or more global variables. In some embodiments, $\hat{f} = \mu_\phi(x_{1:T})$.

A uniform distribution for the one or more local variables may be defined by $$\tilde{z}_t \sim q_\phi(z_t \mid x_t) = \mathcal{U}(\hat{z}_t - \frac{1}{2}, \hat{z}_t + \frac{1}{2})$$

where $\tilde{z}_t$ may represent a noisy local latent variable (e.g., z after noise has been added), $q_\phi$ may represent an approximation for the global posterior, f may represent the one or more global variables, $x_{1:T}$ may represent a given frame of target content at time T, $\mathcal{U}$ may represent noise added, and $\hat{f}$ may represent a mean of the one or more global variables. In some embodiments, $\hat{z}_t = \mu_\phi(x_t)$.

At operation 218, the latent space may be quantized. The quantization may be based on the multiple distributions. In embodiments, the multiple distributions may be selected based on exceeding corresponding thresholds. For example, the threshold value may be based on one or more of the equations above. Quantizing may round the remaining values to various degrees (e.g., 1000, 100, 10, 1, 0.1, 0.01, 0.001, etc.).

At operation 220, the quantized latent space may be encoded. Encoding may include entropy encoding to incorporate the multiple distributions. Entropy encoding may result in a binary format. Quantized latent variables may be mapped into a short binary description by utilizing probability distributions from the predictive model, as described herein. Methods for entropy coding may include arithmetic coding, range coding, Huffman coding, etc. The binary description can be inverted back into the latent variables by decoding the binary with a binary decoder which may also include the probability distributions. In some embodiments, the probability distribution may have been learned by the binary decoder. It should be appreciated that other lossless forms of encoding may be used for different applications.

At operation 222, encoded latent space may be decoded. Decoding may symmetrically follow the encoding process. In embodiments, decoding may include entropy decoding the encoded latent space. Decoding may include combining entropy decoded latent space with a multilayer perceptron model. In some embodiments, decoding may include applying multiple deconvolutions to a combination of the entropy decoded latent space with the multilayer perceptron model, deconvolutional neural network model, transposed convolutional network, and/or other models.

One example of the above disclosed technology may use the following models, function, and/or algorithms. $x_{1:T}=(x_1, \ldots, x_T)$ may denote a video sequence T consecutive frame, where T may be about 10 to about 100 frames, but it should be appreciated that the time interval can be longer or shorter. The generative model may capture the probability distribution of video frames and allow one to generate a likely video sequence. In the presently disclosed technology, two sets of latent variables, $z_{1:T}$ and f, may be used. The video may be non-linearly transformed into the latent representation and stored as $z_{1:T}$ and f. The generative model may include a probability distribution over videos and latent variables:

$$p_\theta(x_{1:T}, z_{1:T}, f) = p_\theta(f) \prod_{t=1}^{T} p_\theta(z_t \mid z_{<t}) p_\theta(x_t \mid z_t, f)$$

where the frame $x_t$ at time t may depend on the corresponding latent variables $z_t$ and f, and θ is shorthand notation for all the parameters of the generative model. The prior distribution $p_\theta(f)$ and $p_\theta(z_t|z_{<t})$ can be approximated by various techniques. In some embodiments, the frame likelihood, $p_\theta(x_{1:T},z_{1:T},f)$ may be a Laplace distribution $\nabla(\mu_\theta(z_t, f), \lambda^{-1}1)$. For $p_\theta(f)$, a general parametrization for the probability density may be used. For $p_\theta(z_t| z_{<t})$, several models described above, such as, for example, the Kalman filter, LSTM, and bi-directional LSTM, may be used. A conditioned network may generate a reconstructed frame, or a decoded frame, by taking the most likely frame $\tilde{x}_t$=argmax $p_\theta(x_t|f, z_t)=\mu_\theta(z_t, f)$, using the same definitions for the variables as described above.

The decoder, which recovers an approximation to the current frame from the latent variables, can be obtained from the conditional part of the full generative model. The decoded frame may be denoted $\hat{x}_t=p_\theta(x_t| f,z_t)$, where $p_\theta(x_t| f, z_t)$ may be referred to as the decoder. Latent variables from a current frame $x_t$ may be inferred by the encoder, q:

$$q_\phi(z_{1:T}, f|x_{1:T})=q_\phi(f|x_{1:T})\Pi_{t=1}^{T}=q_\phi(z_t|x_t).$$

$q_\phi(z_{1:T}, f|x_{1:T})$ may be a variational approximation to the true posterior $q_\phi(z_{1:T}, f|x_{1:T})$. Notice that f may be inferred from all video frames in a sequence, while $z_t$ may be inferred from a single frame $x_t$. In other words, f may include global information which may be common to multiple video frames in a segment, and $z_t$ may include local information or information content that is substantially different for every frame. The encoder, decoder, and prior probability distributions over f and z may be learned jointly by optimizing the loss function. It should be appreciated that different equations and variables may be used in different applications.

In one example, for a video size of 64 by 64 pixels, the decoder may include five convolutional layers. For layer l=1, 2, 3, 4 the number of stride and padding may be 2 and 1, respectively, and the convolutional kernel size may be 4. Stride may refer to how a filter convolves around an input volume and/or how a filter may shift through the input space. Padding may refer to adding null values to surround an input volume to ensure the output volume matches the original input volume. The number of channels for layer l=1, 2, 3, 4 may be 128, 256, 512, 512. Layer 5 may have kernel size 4, stride 1, padding 0, and number of channels as 1024. The decoder architecture may be chosen to be symmetric to the encoder with convolutional layers replaced with deconvolutional (upsampling) layers. In embodiments, f, z, and h may be 512, 64, and 1024, respectively. It should be appreciated that different values (e.g., number of layers, stride, padding, kernel size, channel numbers, etc.) may be used for different applications.

It should be appreciated that although reference is made to video, the presently disclosed technology may be applied to other media content.

Figure 3A:
FIG. 3A illustrates example compressed target content using the presently disclosed technology, in accordance with various embodiments of the present disclosure.
Figure 3C:
FIG. 3C illustrates example compressed target content using VP9.
Figure 3B:
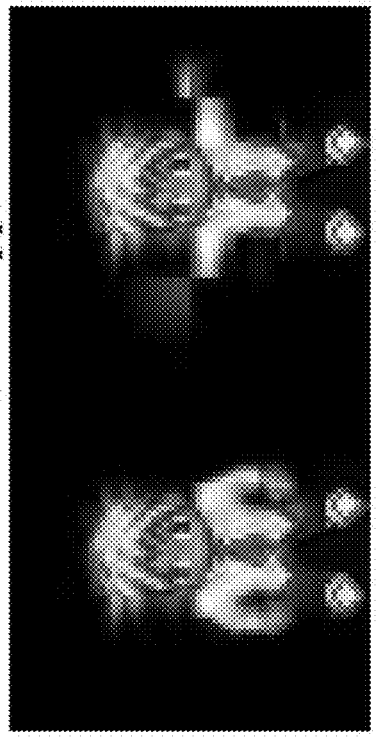
FIG. 3B illustrates example compressed target content using H.265.

FIGS. 3A, 3B, and 3C illustrate example compressed target content comparing the presently disclosed technology to existing technologies. As illustrated, the image quality in FIG. 3A is as good as or better than H.265 and VP9 at time t=1. At time t=6, the presently disclosed technology is much better than H.265 and VP9. Using the presently disclosed technology, bits per pixel (bpp) was about 0.06 and the PSNR was about 44.6 dB. H.265 had a bpp of about 0.86 and PSNR of about 21.1 dB, and VP9 had a bpp of about 0.57 and a PSNR of about 26.0 dB.

Figures 4A, 4B:
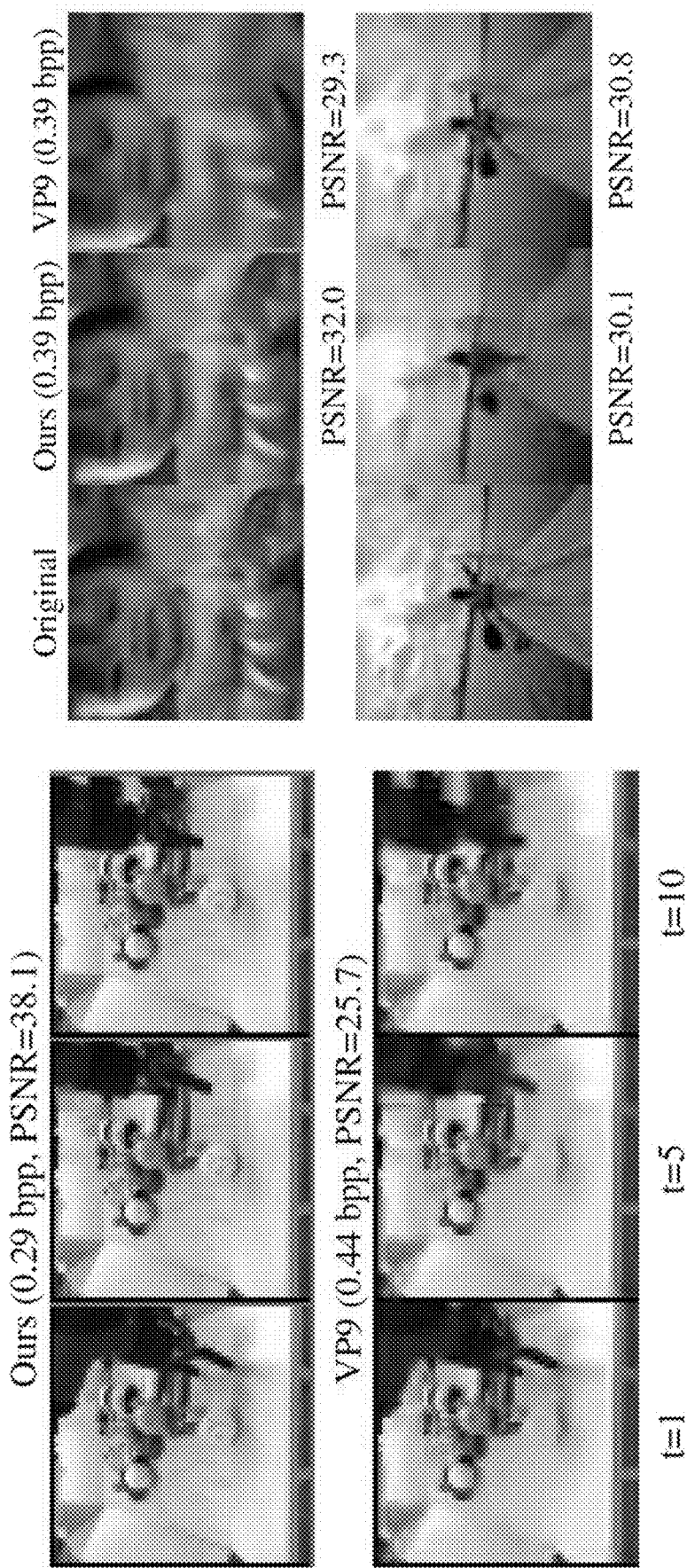
FIG. 4A illustrates example compressed target content comparing the presently disclosed technology to existing technology, in accordance with various embodiments of the present disclosure.
FIG. 4B illustrates example compressed target content comparing the presently disclosed technology to existing technology, in accordance with various embodiments of the present disclosure.

FIGS. 4A and 4B illustrate example compressed target content comparing the presently disclosed technology to existing technology, in accordance with various embodiments of the present disclosure. As illustrated, the image quality is improved compared to existing technology, such as VP9. In FIG. 4A, the presently disclosed technology had a bpp of about 0.29 and a PSNR of about 38.1 compared to VP9's bpp of about 0.44 and a PSNR of about 25.7. The images are also sharper in the presently disclosed technology than VP9 in FIG. 4A. In FIG. 4B, the presently disclosed technology had a bpp of about 0.39 and a PSNR of about 32.0 for the top image and a PSNR of about 30.1 for the bottom image. VP9 had a bpp of about 0.39 and a PSNR of about 29.3 for the top image and a PSNR of about 30.8 for the bottom image.

Figures 5A, 5B:
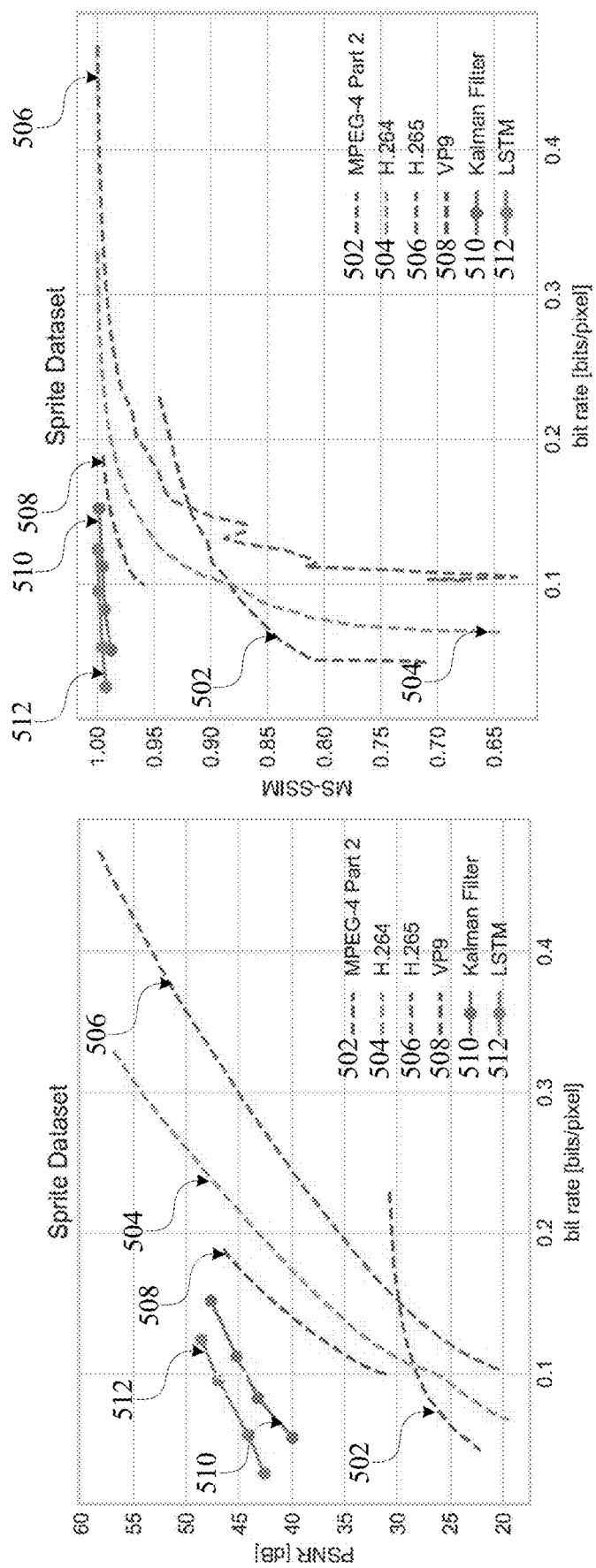
FIG. 5A illustrates example performance of the disclosed technology on a video dataset, in accordance with various embodiments of the present disclosure.
FIG. 5B illustrates example performance of the disclosed technology on a video dataset, in accordance with various embodiments of the present disclosure.
Figures 6A, 6B:
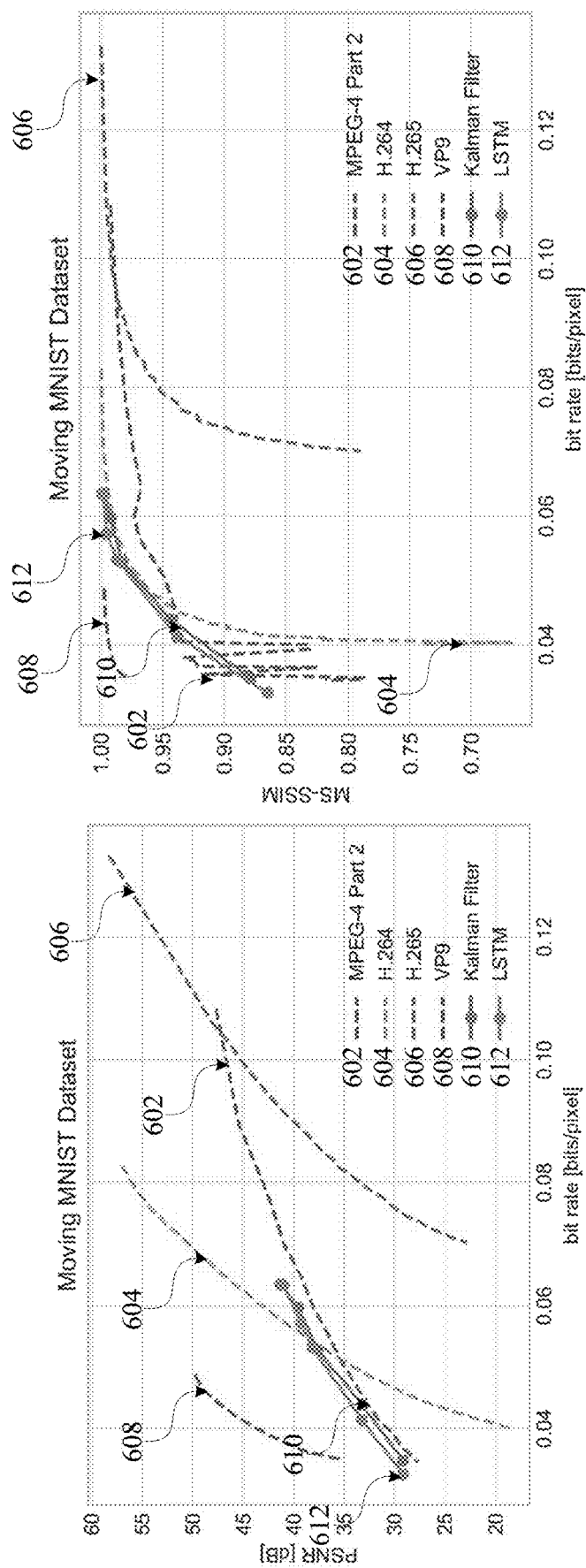
FIG. 6A illustrates example performance of the disclosed technology on a video dataset, in accordance with various embodiments of the present disclosure.
FIG. 6B illustrates example performance of the disclosed technology on a video dataset, in accordance with various embodiments of the present disclosure.

FIGS. 5A, 5B, 6A, and 6B illustrate example performance of the disclosed technology on a video dataset. FIGS. 5A and 5B may use a first data set and FIGS. 6A and 6B may use a second data set. Each video set has a size of about 64 by about 64 pixels. As illustrated, curves 502, 504, 506, and 508 illustrate using MPEG-4 part 2, H.264, H.265, and VP9, respectively. Curves 510 and 512 illustrate using a Kalman filter model and a LSTM model, respectively. The x-axis corresponds to bit rate in bits/pixel (lower being better performance), and the y-axis corresponds to distortion measured in PSNR or MS-SSIM (higher being better performance). Each codec produces a rate distortion curve, and better performance corresponds to being above the curves of other codecs. As illustrated, the presently disclosed technology outperforms most codecs on these videos.

Figures 7A, 7B, 7C:
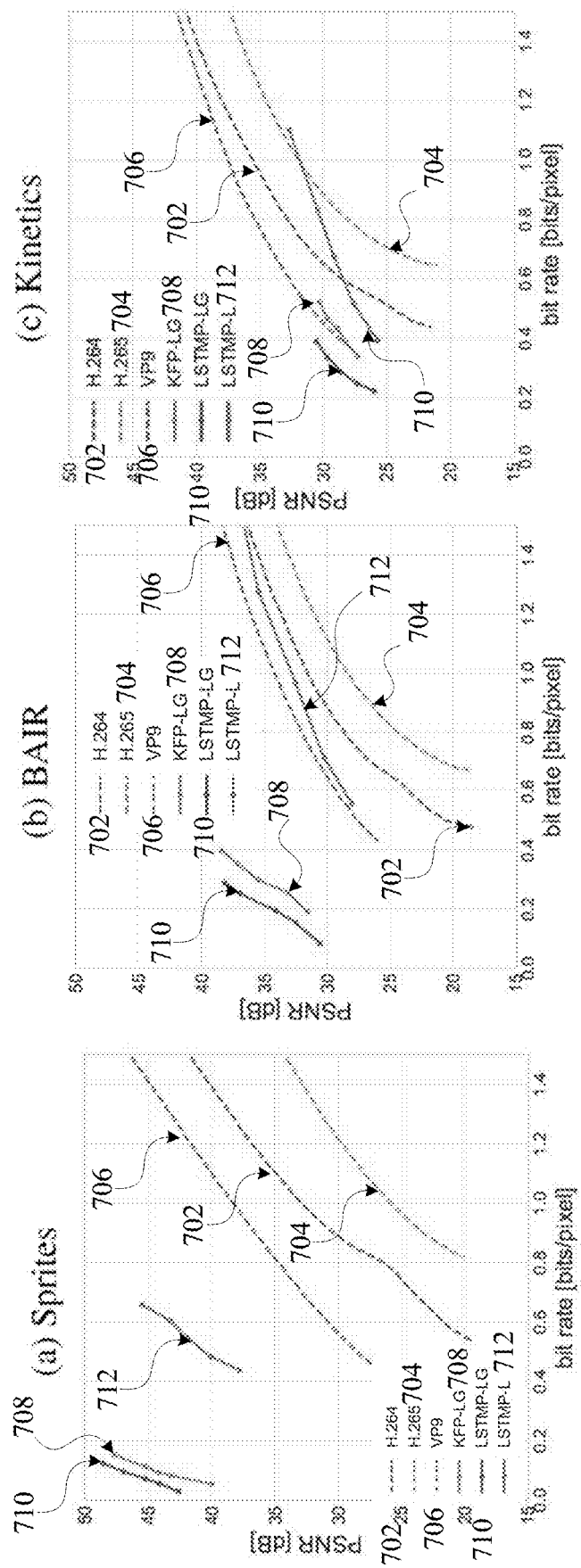
FIG. 7A illustrates example rate-distortion curves using multiple compression models, in accordance with various embodiments of the present disclosure.
FIG. 7B illustrates example rate-distortion curves using multiple compression models, in accordance with various embodiments of the present disclosure.
FIG. 7C illustrates example rate-distortion curves using multiple compression models, in accordance with various embodiments of the present disclosure.

FIGS. 7A, 7B, and 7C illustrate example rate-distortion curves using multiple compression models, in accordance with various embodiments of the present disclosure. FIG. 7A may use first training content, FIG. 7B may use second training content, and FIG. 7C may use third training content. As illustrated, higher curves indicate better performance. Curves 702, 704, and 706 illustrate H.264, H2.65, and VP9, respectively, while curves 708, 710, and 712 illustrate embodiments of the presently disclosed technology (e.g., KFP-LG, LSTMP-LG, and LSTMP-L, respectively). The axes are substantially similar to FIGS. 5A, 5B, 6A, and 6B, as described above.

Figures 8A, 8B, 8C:
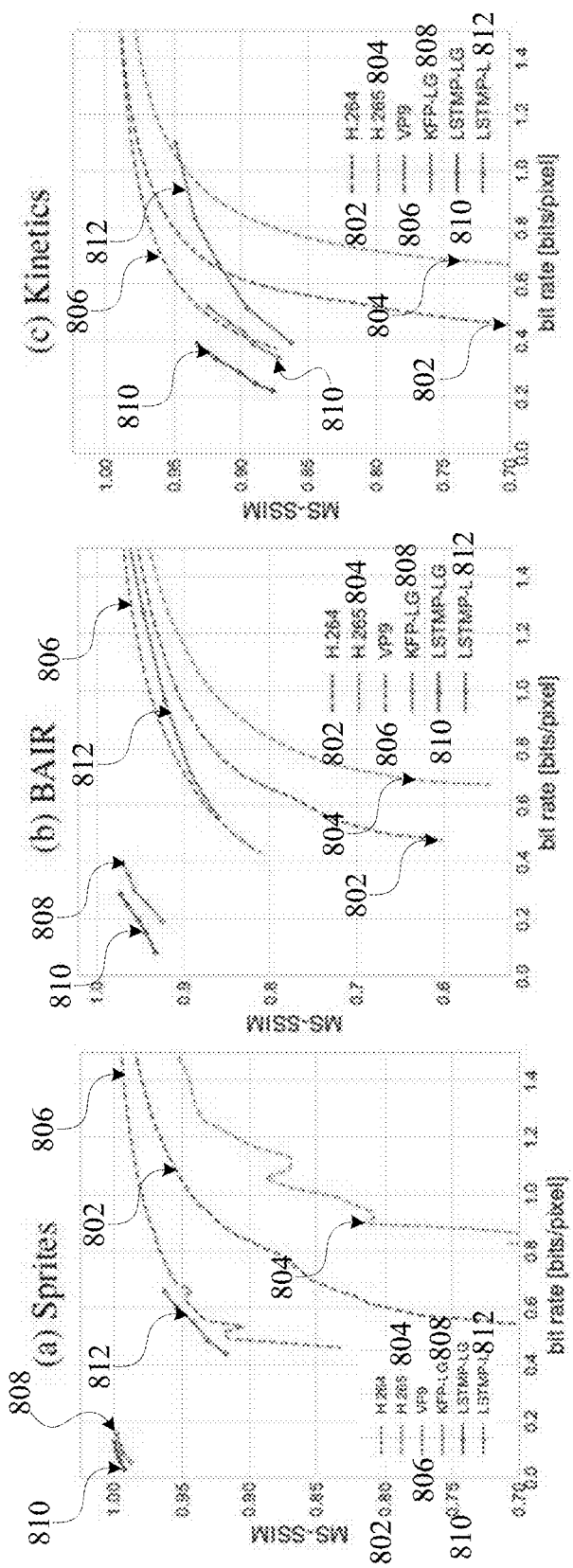
FIG. 8A illustrates example rate-distortion curves using multiple compression models, in accordance with various embodiments of the present disclosure.
FIG. 8B illustrates example rate-distortion curves using multiple compression models, in accordance with various embodiments of the present disclosure.
FIG. 8C illustrates example rate-distortion curves using multiple compression models, in accordance with various embodiments of the present disclosure.

FIGS. 8A, 8B, and 8C illustrate example rate-distortion curves using multiple compression models, in accordance with various embodiments of the present disclosure. FIG. 8A may use first training content, FIG. 8B may use second training content, and FIG. 8C may use third training content. The x-axis may represent bits per pixel, or a bit rate, and the y-axis may represent a multi-scale structural similarity value, which may be a perception-based metric that approximates the perceived change in structural formation. Higher curves may indicate less distortion. Curves 802, 804, and 806 illustrate H.264, H2.65, and VP9, respectively, while curves 808, 810, and 812 illustrate embodiments of the presently disclosed technology (e.g., KFP-LG, LSTMP-LG, and LSTMP-L, respectively).

Figure 9C:
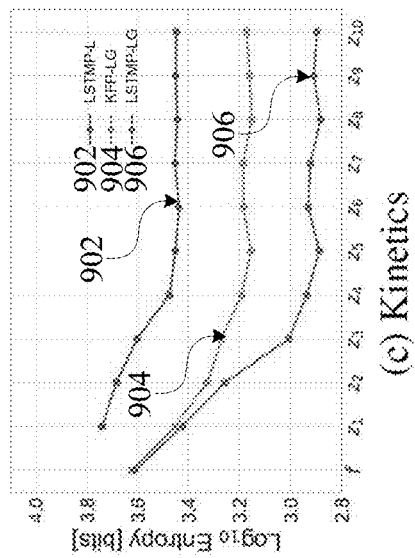
FIG. 9C illustrates example average bits of information using multiple compression models, in accordance with various embodiments of the present disclosure.
Figure 9B:
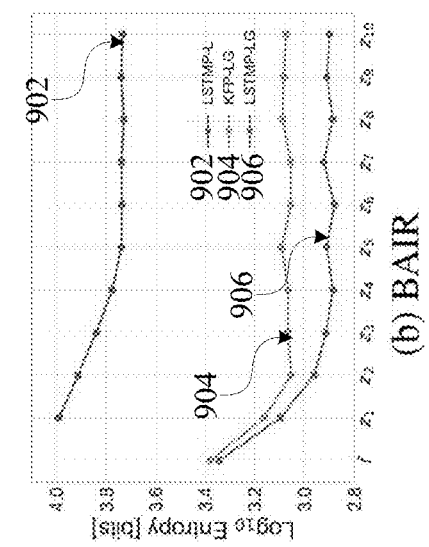
FIG. 9B illustrates example average bits of information using multiple compression models, in accordance with various embodiments of the present disclosure.
Figure 9A:
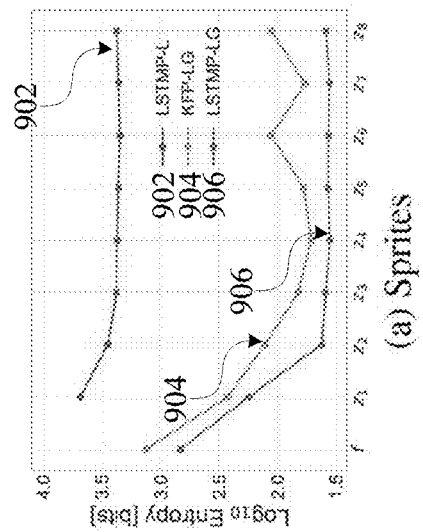
FIG. 9A illustrates example average bits of information using multiple compression models, in accordance with various embodiments of the present disclosure.

FIGS. 9A, 9B, and 9C illustrate example average bits of information using multiple compression models, in accordance with various embodiments of the present disclosure. FIG. 9A may use first training content, FIG. 9B may use second training content, and FIG. 9C may use third training content. The x-axis may represent a frame index, or a given frame or segment, and the y-axis may represent the average bits of information stored in f and z. In FIG. 9A, the PSNR was about 43.2; in FIG. 9B, the PSNR was about 37.1; in FIG. 9C, the PSNR was about 30.3. Entropy drops with the frame index as the multiple compression models adapt to the video sequence. Curves 902, 904, and 906 illustrate embodiments of the presently disclosed technology (e.g., LSTMP-L, KFP-LG, and LSTMP-LG, and respectively).

Figure 10A:
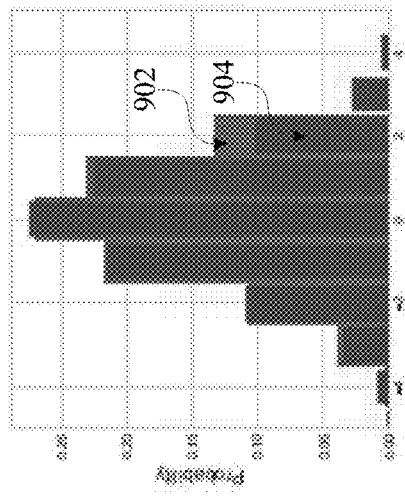
FIG. 10A illustrates example distributions using the presently disclosed technology, in accordance with various embodiments of the present disclosure.
Figure 10B:
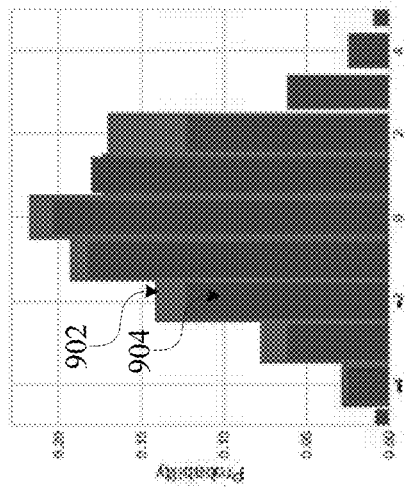
FIG. 10B illustrates example distributions using the presently disclosed technology, in accordance with various embodiments using the present disclosure.
Figure 10C:
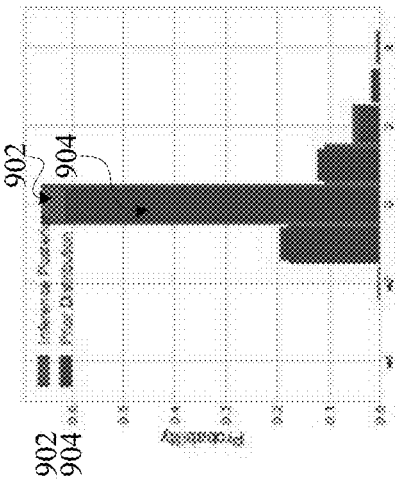
FIG. 10C illustrates example distributions of the presently disclosed technology, in accordance with various embodiments using the present disclosure.
Figure 10D:
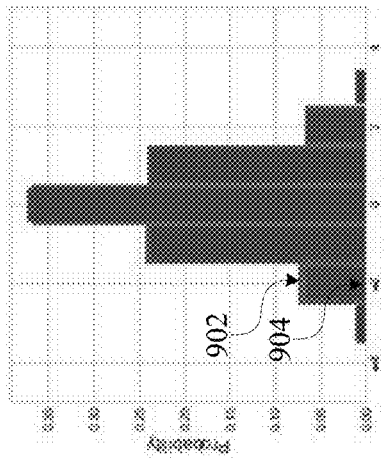
FIG. 10D illustrates example distributions using the presently disclosed technology, in accordance with various embodiments of the present disclosure.

FIGS. 10A, 10B, 10C, and 10D illustrate example distributions using the presently disclosed technology, in accordance with various embodiments of the present disclosure. As illustrated, the prior distribution may be compared to the empirical distribution of the posterior of the compression model. FIGS. 10A and 10B illustrate two dimensions of a given global variable. FIGS. 10C and 10D illustrate two dimensions of a given local variable. The x-axis represents an observation and the y-axis represents a probability of the observation. A higher bar graph indicates a more likely probability of the observation. As illustrated, the posterior of the compression model is the larger bar 1002 surrounding the internal bar 1004 that represents the prior distribution. Bar 1002 substantially matches bar 1004 in FIGS. 10A, 10B, 10C, and 10D.

Figure 11:
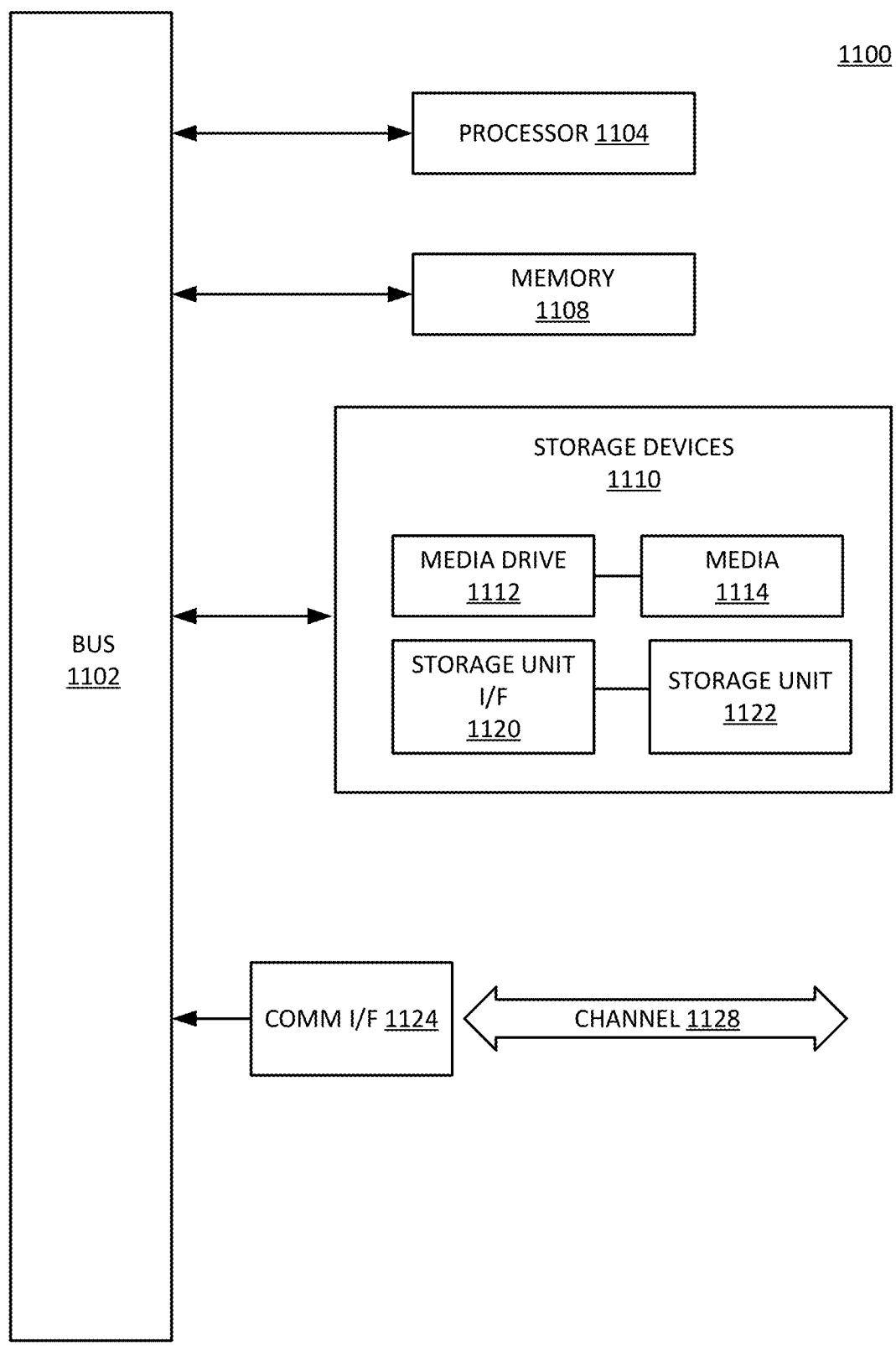
FIG. 11 illustrates an example computing component that may be used to implement features of various embodiments of the disclosure.

As used herein, the term component might describe a given unit of functionality that can be performed in accordance with one or more embodiments of the technology disclosed herein. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In embodiment, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. As used herein, the term engine may describe a collection of components configured to perform one or more specific tasks. Even though various features or elements of functionality may be individually described or claimed as separate components or engines, one of ordinary skill in the art will understand that these features and functionality can be shared among one or more common software and hardware elements, and such description shall not require or imply that separate hardware or software components are used to implement such features or functionality.

Where engines, components, or components of the technology are implemented in whole or in part using software, in one embodiment, these software elements can be implemented to operate with a computing or processing component capable of carrying out the functionality described with respect thereto. One such example computing component is shown in FIG. 11. Various embodiments are described in terms of this example computing component 1100. After reading this description, it will become apparent to a person skilled in the relevant art how to implement the technology using other computing components or architectures.

Referring now to FIG. 11, computing component 1100 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing component 1100 might also represent computing capabilities embedded within or otherwise available to a given device. For example, a computing component might be found in other electronic devices such as, for example, digital cameras, navigation systems, cellular telephones, portable computing devices, modems, routers, WAPs, terminals and other electronic devices that might include some form of processing capability.

Computing component 1100 might include, for example, one or more processors, physical computer processors controllers, control components, or other processing devices, such as a processor 1104. Processor 1104 might be implemented using a general-purpose or special-purpose processing engine such as, for example, a microprocessor, controller, or other control logic. In the illustrated example, processor 1104 is connected to a bus 1102, although any communication medium can be used to facilitate interaction with other components of computing component 1100 or to communicate externally.

Computing component 1100 might also include one or more memory components, simply referred to herein as main memory 1108. For example, preferably random access memory (RAM) or other dynamic memory might be used for storing information and instructions to be executed by processor 1104. Main memory 1108 might also be used for storing temporary variables or other intermediate information during execution of instructions to be executed by processor 1104. Computing component 1100 might likewise include a read only memory ("ROM") or other static storage device coupled to bus 1102 for storing static information and instructions for processor 1104.

The computing component 1100 might also include one or more various forms of information storage device 1110, which might include, for example, a media drive 1112 and a storage unit interface 1120. The media drive 1112 might include a drive or other mechanism to support fixed or removable storage media 1114. For example, a hard disk drive, a floppy disk drive, a magnetic tape drive, an optical disk drive, a CD or DVD drive (R or RW), non-transient electronic storage, and/or other removable or fixed media drive might be provided. Accordingly, storage media 1114 might include, for example, a hard disk, a floppy disk, magnetic tape, cartridge, optical disk, a CD or DVD, or other fixed or removable medium that is read by, written to or accessed by media drive 1112. As these examples illustrate, the storage media 1114 can include a computer usable storage medium having stored therein computer software or data.

In alternative embodiments, information storage mechanism 1110 might include other similar instrumentalities for allowing computer programs or other instructions or data to be loaded into computing component 1100. Such instrumentalities might include, for example, a fixed or removable storage unit 1122 and an interface 1120. Examples of such storage units 1122 and interfaces 1120 can include a program cartridge and cartridge interface, a removable memory (for example, a flash memory or other removable memory component) and memory slot, a PCMCIA slot and card, and other fixed or removable storage units 1122 and interfaces 1120 that allow software and data to be transferred from the storage unit 1122 to computing component 1100.

Computing component 1100 might also include a communications interface 1124. Communications interface 1124 might be used to allow software and data to be transferred between computing component 1100 and external devices. Examples of communications interface 1124 might include a modem or softmodem, a network interface (such as an Ethernet, network interface card, WiMedia, IEEE 802.XX, or other interface), a communications port (such as for example, a USB port, IR port, RS232 port, Bluetooth® interface, or other port), or other communications interface. Software and data transferred via communications interface 1124 might be carried on signals, which can be electronic, electromagnetic (which includes optical), or other signals capable of being exchanged by a given communications interface 1124. These signals might be provided to communications interface 1124 via a channel 1128. This channel 1128 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1108, storage unit 1120, media 1114, and channel 1128. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 1100 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and embodiments, it should be understood that the various features, aspects, and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more," or the like; and adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to," or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts, and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system configured for compressing target content, the system comprising:
    non-transient electronic storage;
    one or more physical computer processors configured by machine-readable instructions to:
        obtain, from the non-transient electronic storage, the target content comprising one or more frames, wherein a given frame comprises one or more features;
        obtain, from the non-transient electronic storage, a conditioned network, the conditioned network having been trained by training an initial network using training content, wherein the conditioned network comprises one or more encoders, one or more quantizers, and one or more decoders, and wherein the training content comprises one or more training frames, and wherein a given training frame comprises one or more training features;
        apply, with the one or more physical computer processors, the conditioned network to the target content to generate a latent space of the target content comprising one or more local variables, one or more global variables, and a plurality of distributions corresponding to the latent space; and
        quantize the one or more local variables and the one or more global variables based on the plurality of distributions corresponding to the latent space to generate encoded target content.

2. The system of claim 1, wherein the one or more local variables are based on the one or more features in the given frame, wherein the one or more global variables are based on one or more features common to a plurality of frames of the target content, and wherein the plurality of distributions indicate a likelihood of values for the one or more local variables and the one or more global variables.

3. The system of claim 1, wherein the one or more physical computer processors are further configured by machine-readable instructions to:
    apply, with the one or more physical computer processors, a plurality of convolutional layers to the target content to generate convolved target content;
    apply, with the one or more physical computer processors, a global model to the convolved target content to generate the one or more global variables; and
    apply, with the one or more physical computer processors, a multilayer perceptron model to the convolved target content to generate the one or more local variables.

4. The system of claim 3, wherein the global model comprises one or more of a long short-term memory model or a Kalman filter.

5. The system of claim 1, wherein applying the conditioned network further comprises:
    decoding, with the one or more physical computer processors, the encoded target content.

6. The system of claim 5, wherein decoding the encoded target content comprises:
    entropy decoding, with the one or more physical computer processors, the encoded target content;
    combining, with the one or more physical computer processors, the entropy decoded target content with a multilayer perceptron model; and
    applying, with the one or more physical computer processors, a plurality of deconvolutions to a combination of the entropy decoded target content with the multilayer perceptron model.

7. The system of claim 1, wherein the plurality of distributions corresponding to the latent space comprise noise, and are centered around means of the one or more global variables and the one or more local variables.

8. A computer-implemented method for training an initial network to simultaneously learn how to refine a latent space using training content and how to refine a plurality of distributions of the latent space using the training content, the method being implemented in a computer system that comprises non-transient electronic storage and one or more physical computer processors, comprising:
    obtaining, from the non-transient electronic storage, training content comprising one or more training frames, wherein a given training frame comprises one or more training features;
    obtaining, from the non-transient electronic storage, the initial network, the initial network comprising one or more encoders, one or more quantizers, and one or more decoders; and
    generating, with the one or more physical computer processors, a conditioned network by training the initial network using the training content, the conditioned network comprising the one or more encoders, the one or more quantizers, and the one or more decoders, wherein the conditioned network is trained to receive target content and generate encoded target content comprising a quantized latent space that includes one or more quantized local variables and one or more quantized global variables.

9. The computer-implemented method of claim 8, further comprising:
    obtaining, from the non-transient electronic storage, the target content comprising one or more frames, wherein a given frame comprises one or more features;
    encoding, with the one or more physical computer processors, the target content to generate one or more local variables and one or more global variables using the conditioned network;
    generating, with the one or more physical computer processors, the latent space using the conditioned network, the latent space comprising the one or more local variables and the one or more global variables, wherein the one or more local variables are based on the one or more features in the given frame, and wherein the one or more global variables are based on one or more features common to a plurality of frames of the target content;
    generating, with the one or more physical computer processors, the plurality of distributions corresponding to the latent space using the conditioned network, wherein the plurality of distributions indicate likelihoods of values for the one or more local variables and the one or more global variables; and quantizing, with the one or more physical computer processors, the one or more local variables and the one or more global variables based on the plurality of distributions using the conditioned network.

10. The computer-implemented method of claim 9, further comprising:

encoding, with the one or more physical computer processors, the one or more quantized local variables and the one or more quantized global variables; and decoding, with the one or more physical computer processors, the one or more encoded quantized local variables and the one or more encoded quantized global variables.

11. The computer-implemented method of claim 10, wherein decoding the one or more encoded quantized local variables and the one or more encoded quantized global variables comprises:

entropy decoding, with the one or more physical computer processors, the one or more encoded quantized local variables and the one or more encoded quantized global variables;

combining, with the one or more physical computer processors, the one or more entropy decoded quantized local variables and the one or more entropy decoded quantized global variables with a multilayer perceptron model; and applying, with the one or more physical computer processors, a plurality of deconvolutions to a combination of the one or more entropy decoded quantized local variables and the one or more entropy decoded quantized global variables with the multilayer perceptron model.

12. The computer-implemented method of claim 9, wherein the plurality of distributions corresponding to the latent space comprise noise, and are centered around means of the one or more global variables and the one or more local variables.

13. The computer-implemented method of claim 9, wherein encoding the target content comprises:

applying, with the one or more physical computer processors, a plurality of convolutional layers to the target content to generate convolved target content;

applying, with the one or more physical computer processors, a long short-term memory model to the convolved target content to generate the one or more global variables; and applying, with the one or more physical computer processors, a multilayer perceptron model to the convolved target content to generate the one or more local variables.

14. A computer-implemented method for compressing target content, the method being implemented in a computer system that comprises non-transient electronic storage and one or more physical computer processors, comprising:

obtaining, from the non-transient electronic storage, the target content comprising one or more frames, wherein a given frame comprises one or more features;

encoding, with the one or more physical computer processors, the target content to generate one or more local variables and one or more global variables; and generating, with the one or more physical computer processors, a latent space, the latent space comprising the one or more local variables and the one or more global variables, wherein the one or more local variables are based on the one or more features in the given frame, and wherein the one or more global variables are based on one or more features common to a plurality of frames of the target content;

generating, with the one or more physical computer processors, a plurality of distributions corresponding to the latent space; and quantizing the one or more local variables and the one or more global variables based on the plurality of distributions corresponding to the latent space.

15. The computer-implemented method of claim 14, wherein the plurality of distributions indicate a likelihood of values for the one or more local variables and the one or more global variables.

16. The computer-implemented method of claim 15, further comprising:

encoding, with the one or more physical computer processors, a quantized latent space that includes the one or more quantized local variables and the one or more quantized global variables; and decoding, with the one or more physical computer processors, the encoded quantized latent space.

17. The computer-implemented method of claim 16, wherein decoding the encoded quantized latent space comprises:

entropy decoding, with the one or more physical computer processors, the encoded latent space;

combining, with the one or more physical computer processors, the entropy decoded latent space with a multilayer perceptron model; and applying, with the one or more physical computer processors, a plurality of deconvolutions to a combination of the entropy decoded latent space with the multilayer perceptron model.

18. The computer-implemented method of claim 14, wherein encoding the target content comprises:

applying, with the one or more physical computer processors, a plurality of convolutional layers to the target content to generate convolved target content;

applying, with the one or more physical computer processors, a long short-term memory model to the convolved target content to generate the one or more global variables; and applying, with the one or more physical computer processors, a multilayer perceptron model to the convolved target content to generate the one or more local variables.

19. The computer-implemented method of claim 14, wherein the plurality of distributions corresponding to the latent space are centered around means of the one or more global variables and the one or more local variables, and wherein random noise is added to the plurality of distributions.

20. The computer-implemented method of claim 14, wherein the latent space comprises a global density model corresponding to the one or more global variables and a local density model corresponding to the one or more local variables.

* * * * *